March 5, 1957  C. A. THOMAS  2,783,771
STALL COCK
Filed Nov. 12, 1952
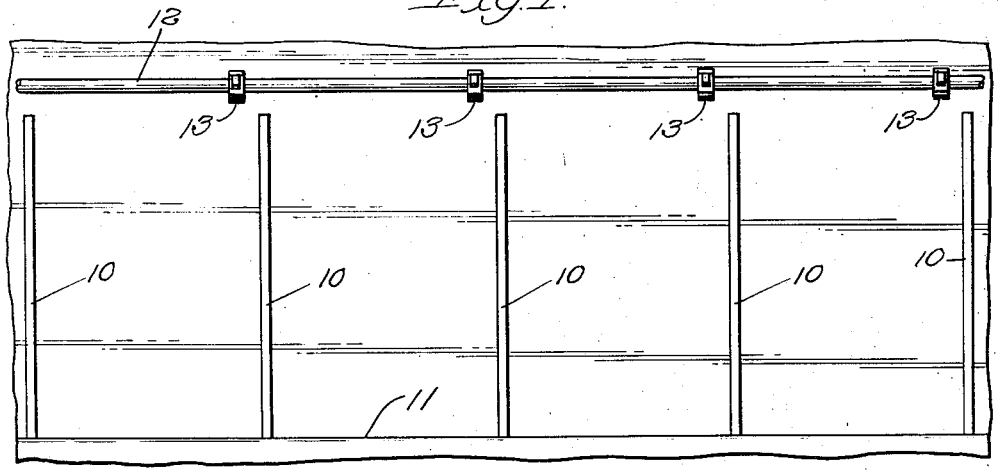
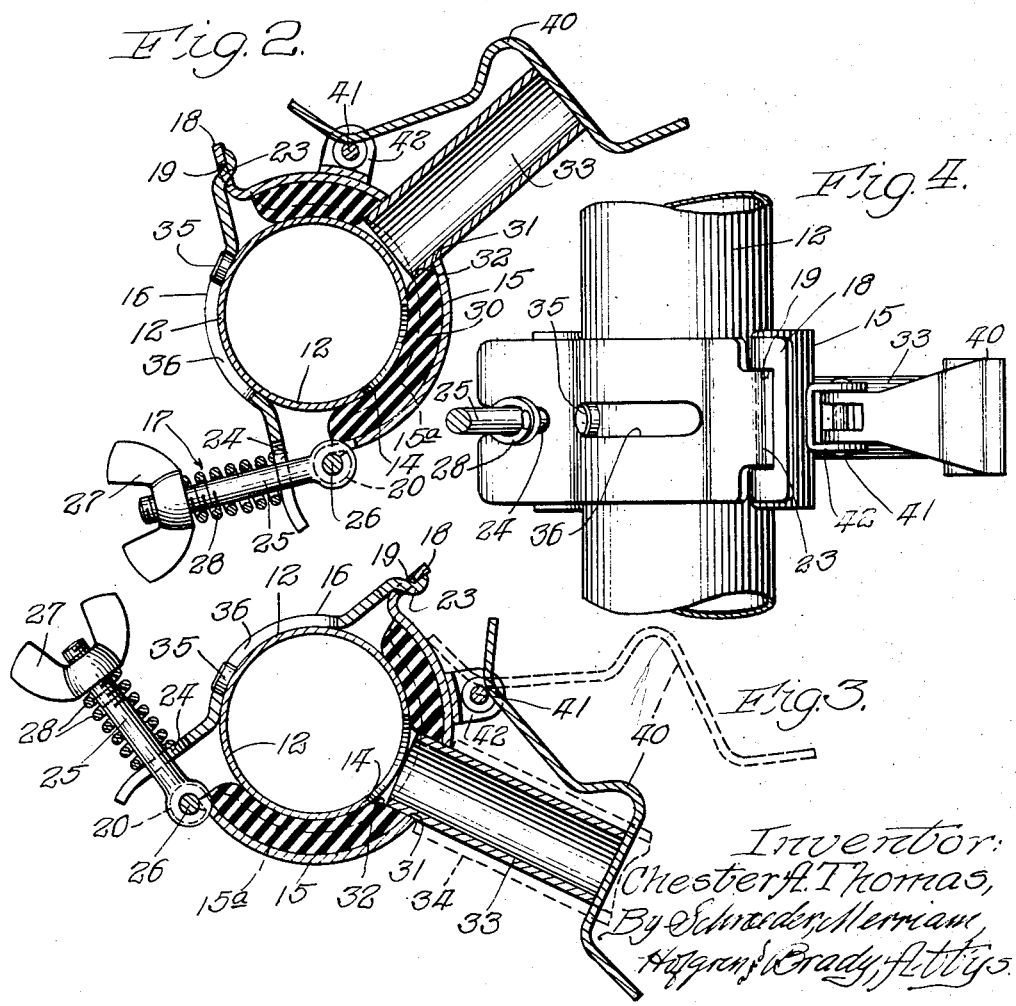
Inventor:
Chester A. Thomas,
By Schroeder, Merriam,
Hofgren & Brady, Attys.

United States Patent Office 2,783,771
Patented Mar. 5, 1957

2,783,771

STALL COCK

Chester A. Thomas, Lake Forest, Ill., assignor to Babson Bros. Co., a corporation of Illinois Application November 12, 1952, Serial No. 319,812

4 Claims. (Cl. 137—238)

This invention relates to a cock and more particularly to a stall cock for use in a pipeline of a milking system.

One feature of this invention is that it provides a cock which may be used with a pipe having a hole in the wall thereof for controlling the flow of fluid through the hole. Another feature of this invention is that it provides a cock which is readily removable from the pipeline with which it is associated to facilitate disassembly of the system for washing. A further feature of this invention is that it provides a cock including an arcuate body member having a flow opening therein, a connector nipple carried by the body member and communicating with the flow opening, a retaining member adapted to engage a portion of the wall of the pipe, clamping means resiliently securing the body member and the retaining member about the pipe, and resilient sealing means providing a seal between the body member and the wall of the pipe, the cock being adapted for only limited relative circumferential movement with respect to the pipe whereby the body member may be moved between a first position in which the flow opening therein communicates with the hole in the pipe and a second position in which the hole is closed, to control flow of fluid therethrough. Yet a further feature of this invention is that it provides a guard member adapted to cover the end of the connector nipple at least when the cock is in closed position to keep the nipple free of insects, dirt and the like.

Further features and advantages of this invention will be readily apparent from the following specification and the drawings, in which:

Figure 1 is an elevational view of a row of stalls with a pipeline and a plurality of stall cocks thereabove;

Figure 2 is a view partly in side elevation and partly in section of a stall cock embodying my invention, showing the stall cock in closed position;

Figure 3 is a view similar to Figure 2, showing the stall cock in open position; and Figure 4 is a top plan view of the stall cock, looking down on Figure 3, with portions broken away.

Milk installations in a dairy barn wherein each cow is milked in her own stall, as distinguished from a dairy barn having milking parlors of the type disclosed in Babson et al. Patent Re. 22,368, generally provide vacuum for operating the milking apparatus, including the pulsator, through a pipeline located above and at the rear of the row of stalls. Such a pipeline is part of a vacuum system which includes a motor driven pump and a vacuum tank; connection to the milking apparatus being made through a flexible hose and a stall cock or connector in the pipeline.

On large dairy farms, where hundreds or even as many as a thousand or more cows may be milked at each milking, it is becoming increasingly common to use a carry-away milking system such as that shown in my copending application Serial No. 219,692, filed April 6, 1951, now Patent No. 2,706,965, issued April 26, 1955. In a system of this kind a second pipeline, the carry-away milk line, is installed along the row of stalls, as adjacent the first or operating vacuum line. The carry-away milk line is connected to a source of vacuum, as is also the vacuum line for operating the pulsator and inflations, a shut-off valve or stall cock generally is provided in the carry-away line at each stall although in some cases there may be one for every other stall or possibly every third stall. A flexible hose connects the milk discharge port of the milk withdrawing apparatus to the carry-away line through the stall cock. The milk passes from the milk withdrawing apparatus through a flexible hose into the carry-away milk line and flows through this line under the influence of the vacuum applied to the line, and in some cases the additional force of gravity or a pump, to a cooler, pasteurizer, storage receptacle or the like.

In the more conventional milking systems used in a barn, the milk from each cow is collected in a separate receptacle, and the receptacles are manually moved to the desired location. The carry-away system materially reduces the labor necessary in the milking operation.

The milk codes in many localities require that milk carry-away pipelines be made of stainless steel, and that they be completely washed immediately after each milking, disassembly sometimes being required. The pipe for these lines is generally furnished in sections 3 to 21 feet in length and adapted to be clamped together in order that they may readily be disassembled. Difficulty has been encountered with ordinary shut-off valves or stall cocks used in installations of this nature. Stainless steel is a difficult material to work, and accordingly, it is rather expensive to install conventional vacuum tight valves as they are needed in such pipelines in the field; as the spacing of stalls may vary considerably from barn to barn. Moreover, it is a troublesome and time consuming job to disassemble, wash and reassemble a large number of conventional valves after each milking.

I have devised and am here disclosing and claiming a valve or stall cock which may readily be affixed to a pipeline and which may readily be removed and disassembled for washing. My valve is vacuum tight or leak proof, which improves the efficiency of the vacuum system. Furthermore, it will not blow apart during "in place" power washing.

In the particular embodiment shown in Figure 1, a plurality of stalls are separated by the partitions 10, which are supported by the floor 11, which is preferably of concrete. A milk carry-away pipeline 12 extends above and along the back of the row of stalls. It should be understood that only a segment of the pipeline 12 is shown in the drawing, it being part of a much larger milk collection system, closed at one end and connected to a source of vacuum at the other. Furthermore, the pipeline has been shown as a continuous element, although it will ordinarily be made up of a plurality of short sections clamped together. A plurality of shut-off valves or stall cocks indicated generally at 13 are spaced along the pipeline, there being one stall cock shown for each stall. The pipeline supplying the vacuum for operating the pulsator and inflations has not been shown in order to clarify the drawings; but might, for example, be located a few inches above and parallel to the carry-away pipeline illustrated.

Referring now to Figures 2, 3 and 4, the pipe 12 has a hole 14 in the wall thereof, the center line of the hole preferably being about 45 degrees below the horizontal diameter of the pipe. The stall cock 13 is made up of a body member 15, a retaining member 16 and resilient clamping means indicated generally as 17. The body member 15 is generally arcuate in shape, substantially conforming to the shape of the wall of the pipe 12, and has flange-like side walls 15a. One end 18 of the body member 15 is bent outwardly therefrom and is provided with a transverse slot 19; the other end forms a pintle bearing 20.

The retaining member 16 is adapted to encircle a portion of the wall of the pipe 12, the center section thereof being generally arcuate in shape, conforming to the wall of the pipe. A tongue 23 at one end of the retaining member 16 projects into the transverse slot 19 and engages the end 18 of the body member 15. The other end of the retaining member 16 is provided with an open ended slot 24 which receives the shank of the bolt 25; the bolt being pivotally mounted on the pintle 26 carried by the pintle bearing 20. A wing nut 27 and coil spring 28 mounted on the bolt 25 complete the resilient clamping means 17. The tongue and slot engagement on one side of the pipe and the slot and bolt connection on the opposite side of the pipe serve to resiliently secure the body member 15 and retaining member 16 on the pipe 12. When in the closed position illustrated in Figure 2, the tongue and slot are approximately 180° removed from the opening 14 so as to permit the body member and retaining member to pivot relative to each other about the tongue and slot as a fulcrum as a result of pressure within the pipe 12.

A resilient gasket 30 carried by the body member 15 provides a seal between the body member and the wall of the pipe 12. The gasket is of a resilient material which resists deterioration, such as a synthetic rubber and is preferably bonded to the body member 15. A flow opening 31 in the wall of the body member 15 and a corresponding flow opening 32 in register therewith in the resilient gasket 30, communicate with the fluid passage of connector nipple 33 which is secured to the body member 15 and extends therethrough into the flow opening 32 in the gasket. The connector nipple 33 is adapted to be connected to a flexible hose 34 as indicated by the dotted lines in Figure 3, this hose being connected to the outlet port of the milk withdrawing apparatus (not shown). The milk withdrawing apparatus may be of any suitable type, see for example my copending application Serial No. 219,692, filed April 6, 1951, now Patent No. 2,706,965, issued April 26, 1955.

The entire stall cock assembly is adapted for circumferential movement about the pipe 12, whereby the flow openings 31 and 32 and the fluid passage of the connector nipple 33 may be moved into register with the hole 14 as shown in Figure 3 or the resilient gasket 30 may close the hole 14 as shown in Figure 2, to control the flow of fluid therethrough. A raised boss 35 on the wall of the pipe 12 substantially diametrically opposite the hole 14 extends into a longitudinal slot 36 in the retaining member 16 limiting the movement of the stall cock assembly about the pipe 12 between the two positions described.

A guard member 40 is pivotally mounted on the body member 15 by a pin 41 carried in the bracket 42. The guard member 40 extends over and covers the end of the connector nipple 33 to prevent insects and dirt from contaminating the system when the hose 34 is not connected to the nipple.

When the stall cock is not in use, it will be in the position shown in Figure 2, the vacuum in the pipeline 12 together with the resilient gasket 30 tightly sealing the hole 14. In order to make a connection to the carry-away milk line 12, the operator need only slip the end of the hose 34, which is connected to the outlet port of the milking apparatus, over the connector nipple 33 and rotate the stall cock assembly downwardly through the limited movement allowed until the flow openings 31 and 32 in the body member 15 and gasket 30 respectively are aligned with the hole 14. Milk will then flow from the milking apparatus through the hose 34 and connector nipple 33 into the pipeline 14, where it joins the milk from other cows and flows under the influence of the vacuum to a discharge point (not shown).

When the cow has been completely milked, the milking apparatus may be disconnected from the carry-away line with one movement, rotating the stall cock 13 upwardly through the limit of its movement to the position shown in Figure 2, and removing the hose 34 from the nipple 33. The guard member 40 now covers the end of the nipple 33 keeping it free from contamination until the operator has the next cow ready to milk.

The stall cock 13 may readily be removed from the pipeline 12 for washing by merely loosening the wing nut 27 and disengaging the bolt 25 and coil spring 28 from the slot 24 in the retaining member 16. The entire stall cock assembly may then easily be lifted from the pipe 12. After the pipe and the stall cock have been washed, the stall cock may readily be replaced on the pipe by inserting the tongue 23 in the slot 19, placing the body member and retaining member on the pipe with the boss 35 extending into the slot 36, swinging the bolt 25 upwardly into the slot 24 and tightening the wing nut 27.

My stall cock is also particularly suited for use with a pipeline which may be washed in place. In a system of this type, the carry-away milk line is not disassembled after each milking; rather, hot water and a detergent are forced through the milk line under a pressure of the order of fifty pounds per square inch. After the line has been thoroughly washed, it is flushed with clear water. Ordinary stall cocks used in such systems must be individually washed. With my stall cock, which is resiliently clamped on the pipeline, the high pressure used during washing will cause the water-detergent mixture to leak out between the gasket 30 and the wall of the pipe 12, washing away any milk which adheres to the gasket.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a carry-away milk pipe line, a stall cock of the character described, comprising: a section of pipe line having an opening in the wall thereof; a valve member including a split band having an opening therethrough mounted on said pipe line for rotation between a first position in which said opening communicates with the opening in the pipe line and a second position in which the opening in said pipe line is closed; and resilient means securing said split band on said pipe line, the split band having a fulcrum portion generally opposite said resilient means, said resilient means being positioned adjacent the opening in the pipe line when the valve member is in the second position, whereby washing solution circulating through the pipe line under pressure forces the portion of the band adjacent the pipe line opening away from the wall of the pipe line washing the engaging faces of the band and pipe line adjacent the pipe line opening.

2. In a carry-away milk pipe line, a stall cock of the character described, comprising: a section of pipe line having an opening in the wall thereof; an arcuate body member having an opening therethrough; a retaining member having an end portion pivotally engaged with one end of said body member; and resilient clamping means connected to the other end of said body member and the other end of said retaining member for securing said members on said pipe line for rotation between a first position in which said openings are in communication and a second position in which the opening in the pipe line is closed by said body member, said resilient clamping means being adjacent the pipe line opening when the body member is in the second position whereby washing solution circulating through the pipe line under pressure forces the body member away from the pipe line against the pressure of said resilient clamping means, the body member pivoting about said end of the retaining member.

3. A stall cock of the character described in claim 2, wherein the opening in said pipe line is at an angle below the horizontal, and interengaging means on the pipe line and the split band limit movement of the band between the first and second positions, the opening in the band being at an angle above the horizontal when in the second position.

4. In a carry-away milk pipe line, a stall cock of the character described, comprising: a section of pipe line mounted above the top of a stall and having an opening in the wall thereof at an angle below the horizontal; a valve member having a flow opening therethrough mounted on said pipe line section for rotation thereon; a nipple on said valve member for connection with a milk hose and communicating with said flow opening; and means securing said valve member on said pipe line, permitting manual movement between a first position in which said flow opening communicates with the opening in said wall and a second position in which said opening is closed and said nipple extends upwardly at an angle above the horizontal, said securing means holding said valve member against movement from said second position due to the weight of said milk hose.

References Cited in the file of this patent

UNITED STATES PATENTS

| | | |
|---|---|---|
| 162,683 | Nichols | Apr. 27, 1875 |
| 895,143 | Augensen | Aug. 4, 1908 |
| 1,037,378 | Ward | Sept. 3, 1912 |
| 1,121,316 | Williams | Dec. 15, 1914 |
| 1,272,998 | Rasmussen | July 16, 1918 |
| 1,488,568 | Thompson | Apr. 1, 1924 |

FOREIGN PATENTS

| | | |
|---|---|---|
| 2,865 | Great Britain | of 1863 |